United States Patent [19]

Lefere

[11] Patent Number: 5,608,963
[45] Date of Patent: Mar. 11, 1997

[54] METHOD OF FORMING HOSE AND FIRE SLEEVE END ASSEMBLY

[75] Inventor: Robert M. Lefere, Jackson, Mich.

[73] Assignee: Aeroquip Corporation, Jackson, Mich.

[21] Appl. No.: 557,706

[22] Filed: Nov. 13, 1995

Related U.S. Application Data

[62] Division of Ser. No. 123,865, Sep. 20, 1993, abandoned, which is a continuation of Ser. No. 897,843, Jun. 12, 1992, abandoned.

[51] Int. Cl.[6] .................................................. B29C 65/56
[52] U.S. Cl. ........................ 29/525.01; 138/109; 285/149
[58] Field of Search .................................. 138/96 R, 109, 138/110, 124, 126, 137; 285/239, 240, 241, 149, 249, 252; 29/455.1, 506, 508, 516, 525.01, 525.02; 156/294, 91, 212, 215, 226; 277/207 A

[56] References Cited

U.S. PATENT DOCUMENTS

| | | | |
|---|---|---|---|
| 4,148 | 10/1845 | Perry et al. | |
| 97,853 | 12/1869 | Alden | |
| 100,448 | 3/1870 | Rider et al. | 138/109 |
| 199,349 | 1/1878 | Caswell | 138/109 |
| 1,227,690 | 5/1917 | Subers | |
| 2,380,549 | 7/1945 | Rasor | 138/79 |
| 2,787,289 | 4/1957 | Press | 285/149 |
| 3,037,798 | 6/1962 | Cooper | 285/239 |
| 3,510,140 | 5/1970 | Hermann | 277/207 A |
| 3,744,528 | 7/1973 | Vestal | 138/89 |
| 3,828,823 | 8/1974 | Douglas | 138/109 |
| 3,948,290 | 4/1976 | Arisland | 138/89 |
| 4,158,407 | 6/1979 | Rest | 206/318 |
| 4,182,519 | 1/1980 | Wilson | 277/207 A |
| 4,267,863 | 5/1981 | Burelle | 138/109 |
| 4,488,577 | 12/1984 | Shilad et al. | 138/127 |
| 4,675,221 | 6/1987 | Lalikos et al. | 428/36 |
| 4,757,595 | 7/1988 | Fraering, Jr. | 29/447 |
| 5,342,337 | 8/1994 | Underwood | 138/96 |

Primary Examiner—Steven D. Maki
Attorney, Agent, or Firm—Duncan F. Beaman

[57] ABSTRACT

A firesleeve assembly as used with hose systems, such as pressurized fuel, lubricating and hydraulic circuits. The cut end of a firesleeve utilizing a fibrous material such as glass fiber is enclosed and sealed by a cuff sleeve having a portion located upon the hose, or an associated fitting, wherein a portion of the cuff sleeve is located within the firesleeve adjacent the cut end and another portion of the cuff sleeve is folded over the cut end locating an outer cuff sleeve portion over the outer diameter of the firesleeve and enclosing the firesleeve end. Preferably, an annular clamp circumscribes the cuff sleeve to produce sealing between the cuff sleeve, firesleeve and hose system preventing moisture or liquids from entering the firesleeve end.

3 Claims, 1 Drawing Sheet

5,608,963

METHOD OF FORMING HOSE AND FIRE SLEEVE END ASSEMBLY

This is a division of application Ser. No. 08/123,865 filed Sep. 20, 1993, now abandoned which is a continuation of application Ser. No. 07/897,843 filed Jun. 12, 1992 now abandoned.

BACKGROUND OF THE INVENTION

1. Field of the Invention

The invention pertains to fire resistant firesleeve assemblies as used with hose or pipe systems, and particularly pertains to the sealing of the cut end of a firesleeve utilizing fibrous heat insulative components.

2. Description of the Related Art

Hose systems, particularly fuel, lubricating and hydraulic hose used within aircraft engine compartments, often require fire resistant protection to minimize the likelihood of fire or high temperatures damaging the flexible elastomeric hose of the hydraulic circuits. Typically, resistance to fire and high temperature is achieved by encompassing the hose and portions of the associated hose fittings with a protective firesleeve. The firesleeve often consists of a silicone rubber tube surrounding the hose and/or fitting and the firesleeve usually includes an inner insulative material such as asbestos or glass fiber to provide insulation against the transfer of heat.

Typically, firesleeve material is shipped and stored in indeterminate lengths, often wound upon reels, and the firesleeve is cut to the desired length to accommodate the length of hose with which it is to be used. As the cutting of the firesleeve to the desired length will expose the end of the firesleeve and the fibrous material thereof it is required that the end of the firesleeve be treated or sealed so as to discourage contamination of the firesleeve inner fibrous material and prevent the "wicking" of moisture, fluids, or other liquids into the fibrous material by capillary action.

To "seal" the cut ends of firesleeves, the conventional practice is to dip the cut firesleeve end into a silicone formulated "end-dip" liquid sealant so as to saturate the braided fibrous material adjacent the firesleeve end. Thereupon, the silicon end dip composition is dried and processed prior to the firesleeve being installed upon the associated hose. Such processing of the ends of firesleeves often requires a 24 hour delay, and the handling of a dipped firesleeve is messy, produces dripping, and such end dipping is hazardous and may not produce a liquid impervious end seal.

Further, the silicone formulated end dip used to seal firesleeves may be classified as a hazardous material requiring special and expensive transportation procedures. Further, end dipped firesleeves do not produce a significant frictional engagement with the hose or hose fitting unless the clamping pressures are unusually high and there is a tendency for the firesleeve to axially slide on the hose, possibly exposing a portion of the hose adjacent the fitting to fire in high temperatures.

3. Objects of the Invention

It is an object of the invention to provide a fluid impervious end seal for hose or pipe firesleeve assemblies which is inexpensive, requires no dipping or application of fluids, requires no hazardous materials, and eliminates assembly and processing delays.

Another object of the invention is to provide a seal for the cut ends of hose or pipe firesleeves wherein the seal is formed by a flexible resilient liquid impervious cuff enclosing the firesleeve cut end which totally confines the cut end to produce an effective liquid seal, enhances fire protection, and produces an attractive aesthetically finished hose assembly.

SUMMARY OF THE INVENTION

In the practice of the invention, a firesleeve is conventionally cut to the desired length for the associated hose or pipe, producing a cut end exposing the firesleeve heat resistant inner braided fire resistant material.

A tube of silicone rubber of relatively short length and of an inner diameter substantially equal to the outer diameter of the hose or hose fitting component to be circumscribed by the firesleeve end is placed upon the hose or hose fitting and the firesleeve cut end is inserted over a portion of the silicone tubing, hereinafter referred to the cuff sleeve.

Upon the cut end of the firesleeve being inserted over approximately one-half of the cuff sleeve, the exposed and accessible portion of the cuff sleeve is then folded back over the outer diameter of the firesleeve adjacent the cut end, and in this manner the cuff sleeve is engaging both the inner and outer diameters of the firesleeve, and a portion of the cuff sleeve bridging the inner and outer portions passes over the cut end, and the cuff sleeve thereby completely encloses the firesleeve end.

The cuff sleeve is preferably formed of a flexible and resilient silicone rubber, and the diameter of the cuff sleeve is such that the cuff sleeve outer portion is radially stretched as it is pulled over the firesleeve outer diameter and thereby sealingly engages the firesleeve outer diameter.

Normally, an annular clamp circumferentially extends about the outer portion of the cuff sleeve whereby contracting of the clamp forces the cuff sleeve outer portion upon the outer diameter of the firesleeve, compresses the firesleeve inner diameter upon the cuff sleeve inner portion, and simultaneously compresses the cuff sleeve inner portion upon the hose or hose component. In this manner, an effective seal is achieved between the firesleeve and the hose preventing the entrance of fluids or liquids into the interior of the firesleeve, and eliminates contamination of the firesleeve heat resistant fibrous material.

A cuff sleeve in accord with the inventive concepts may be assembled upon a firesleeve end by an operator having conventional skills, the assembly of the cuff sleeve and firesleeve may be rapidly accomplished, no processing delays are required, and an aesthetically attractive finishing of the end of the firesleeve is produced.

BRIEF DESCRIPTION OF THE DRAWING

The aforementioned objects and advantages of the invention will be appreciated from the following description and accompanying drawing wherein.

DESCRIPTION OF THE PREFERRED EMBODIMENT

Figure 1:
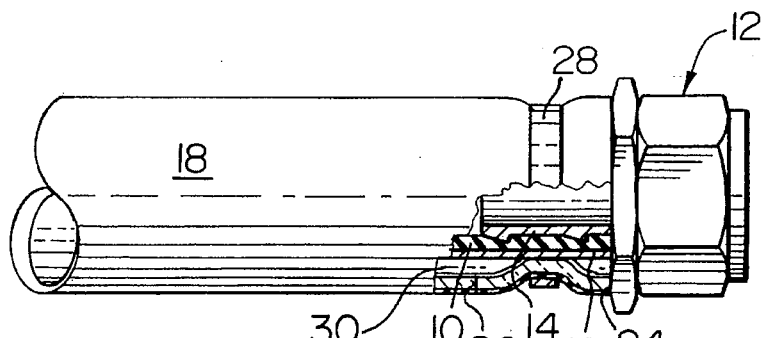
FIG. 1 is an elevational view, partially sectioned, of a typical firesleeve and hose assembly in accord with conventional prior art practice.

In the drawings, FIG. 1 illustrates the conventional prior art assembly of a firesleeve and hose system. Conventionally, a hose 10, such as a fuel, lubricating or hydraulic hose used in a pressurized circuit, is attached to an end fitting 12. The end fitting includes the typical tubular nipple 14 upon which the hose 10 is inserted, and an annular socket 16 circumscribes the hose in radial opposition to the nipple 14 compressing the hose upon the nipple and establishing a sealed mechanical interconnection between the hose 10 and the end fitting 12.

Fuel and hydraulic hose systems located in critical areas possibly subjected to high temperatures or fire, such as within the housings of aircraft engines or the like, often utilize a fire resistant covering to protect the hose, and portions of the fitting, against such high temperatures and possible hose rupture and ignition of fuel and hydraulic fluids. Such fire protection normally takes the form of a tubular firesleeve 18, which may consist of an outer tube 20 of silicone rubber having an inner braided layer of an insulation material 22 such as of asbestos or glass fiber which forms the firesleeve inner surface. The firesleeve 18 is normally shipped and stored upon reels, and the firesleeve is cut to the desired length to accommodate the hose line with which it is to be used, and such sizing results in a firesleeve cut end 24. The cutting of the firesleeve exposes the insulation material 22, and in order to permit sealing of the end region of the firesleeve to the fitting 12, and to discourage "wicking" of liquids or moisture from the cut end, the end region of the firesleeve 18 is usually dipped into a silicone formulated end dip liquid sealant, not shown, which substantially saturates the insulation 22 to the dip line 26, FIG. 1. Thereupon, the dipped firesleeve requires drying and the processing of the firesleeve after dipping requires a substantial passage of time before the dipped firesleeve is dried and can be assembled upon the hose assembly.

Usually, the firesleeve 18 will be located to encompass the length of the hose 10, and the end region will be superimposed over the end fitting socket 16 as shown in FIG. 1. Thereupon, a circumferential contractible band clamp 28 circumscribes the end region of the firesleeve to compress the inner diameter of the sealed firesleeve against the socket 16. Because the inner diameter of the firesleeve is normally greater than the diameter of the socket 16 or the hose 10, a space 30 will normally exist between the firesleeve and hose or fitting which further acts as insulation to resist the transfer of heat.

The prior art firesleeve assembly described above and as shown in FIG. 1 has the disadvantage of requiring processing over a number of hours due to the drying time of the sealant, defects in the sealant between the drip line 26 and the firesleeve end 24 will produce faults in the sealing of the firesleeve, slide-back of the firesleeve on the socket 16 often occurs, and the end 24 is not aesthetically attractive as it has been cut and is visually exposed.

The cuff sleeve of the invention is illustrated in FIGS. 2–5, and components previously described are represented by identical reference numerals.

The cuff sleeve is generally represented at 32 and consists of a relatively short cylindrical tube of a flexible resilient heat resistant material such as silicone rubber having a uniform diameter throughout its length. The cuff sleeve includes a normal inner diameter 34 which may be approximately equal to, or slightly less than, the diameter of the hose or socket 16 upon which it is placed, and in installing the cuff sleeve 32 for cooperation with the firesleeve 18 the sleeve is stretched over the fitting 12 and placed thereon as represented in FIG. 2.

Figure 2:
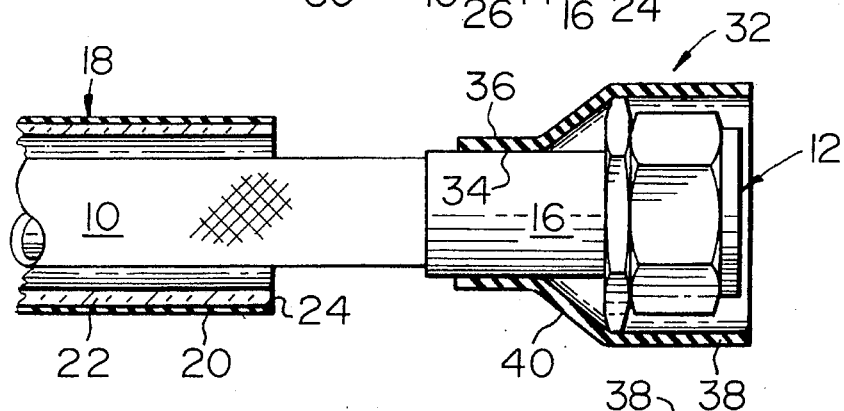
FIG. 2 is a detail, elevational, sectional view of a hose, firesleeve and cuff sleeve in accord with the invention upon the cuff sleeve being located upon a hose end fitting and prior to the firesleeve being inserted upon the cuff sleeve.

As shown in FIG. 2, the extending portion 38 of the cuff sleeve not located on the socket 16 will be stretched to a greater diameter by an enlarged portion of the fitting, and a transition portion 40 of the cuff sleeve exists between the extending portion 38 and the portion of the cuff sleeve engaging the end fitting socket 16.

Figure 3:
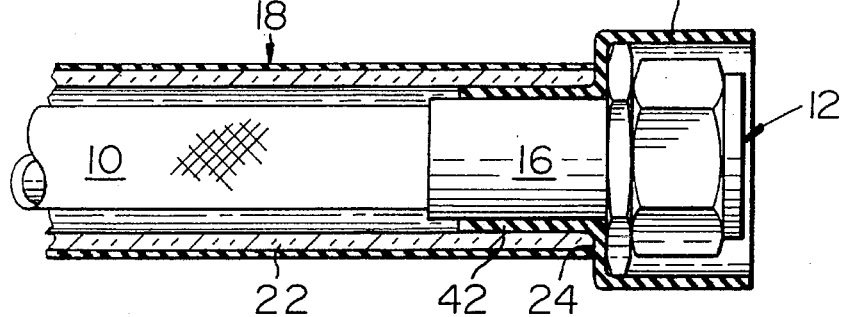
FIG. 3 is a view similar to FIG. 2 illustrating the firesleeve as being inserted upon the cuff sleeve inner portion, and prior to the cuff sleeve outer portion being folded back upon the firesleeve.

After the cuff sleeve has been initially placed upon the end fitting as shown in FIG. 2, the firesleeve 18 is moved to the right, FIG. 3, upon and over the portion of the cuff sleeve located on the socket 16, as designated as cuff sleeve inner portion 42, FIG. 3. The cuff sleeve is pushed over the inner portion 42 as far as possible, as represented in FIG. 3.

Figure 4:
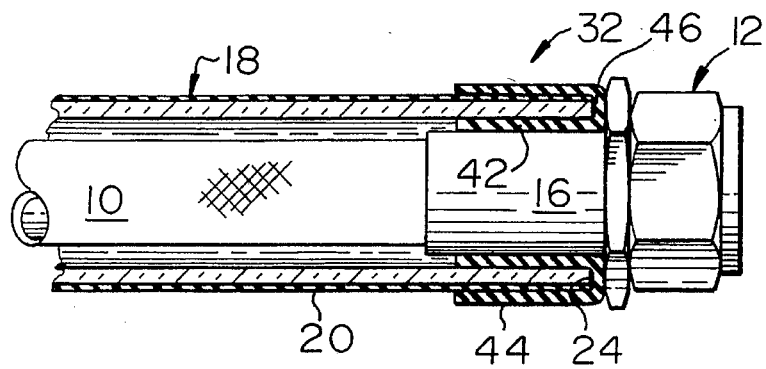
FIG. 4 is a view similar to FIG. 3 illustrating the cuff sleeve outer portion as folded back upon the firesleeve outer portion.

Thereupon, the extending portion 38 of the cuff sleeve is folded back over and upon the outer diameter of the firesleeve as shown in FIG. 4 to define a cuff sleeve tubular outer portion 44. Due to the resilient nature of the cuff sleeve material, the outer portion 44 will sealingly grip the firesleeve and the cuff sleeve 32 will now have the configuration as illustrated in FIG. 4 wherein inner portion 42 and outer portion 44 are in opposed radial relationship to each other with the firesleeve located therebetween, and the cuff sleeve bridging portion 46 will engage and seal the firesleeve end 24. Accordingly, in effect, the cuff sleeve as shown in FIG. 4 defines an annular recess fully enclosing the firesleeve end 24 and an axial portion of the firesleeve adjacent the end 24.

Figure 5:
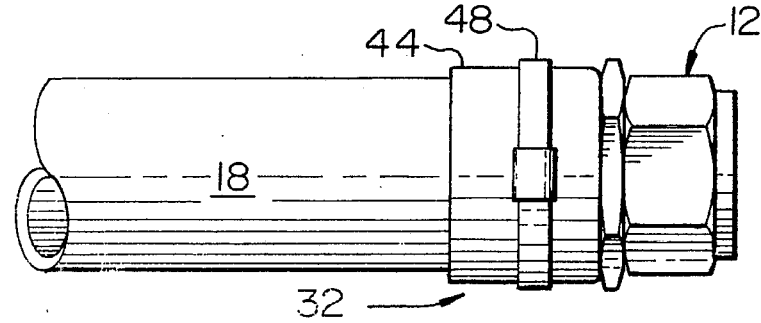
FIG. 5 is an elevational view of the completed hose and firesleeve assembly with the cuff sleeve in place and an annular clamp circumscribing the cuff sleeve outer portion.

Thereupon, a radially contractible annular clamp 48 may be placed upon the cuff sleeve outer portion 44 as shown in FIG. 5, and contracted to compress the sleeve outer portion 44 against the outer diameter of the firesleeve, compress the inner diameter of the firesleeve upon the cuff sleeve inner portion 42, and compress the inner portion 42 upon the end fitting socket 16. Thus, it will be appreciated that the assembly provides an effective liquid tight and impervious seal of the firesleeve end 24, and as will be appreciated from FIG. 5, the firesleeve end 24 is not visible, and an attractive and aesthetically pleasing assembly is produced.

If desired, it is possible to stretch and fold back the portion of the cuff sleeve outer portion 44 to the left of the clamp 48, FIG. 5, over the clamp to cover the clamp 48, for aesthetic or clamp protection purposes.

It is appreciated that various modifications to the inventive concepts may be apparent to those skilled in the art without departing from the spirit and scope of the invention, and in the following claims it is intended that "hose" be interpreted to include flexible hose, pipe or other types of conduit, and "hose" is intended to include the fittings associated with the hose assembly, including the end fitting socket, since the firesleeve may be mounted directly upon the hose, or other components of the hose assembly including the end fitting structure.

I claim:

1. A method of forming a hose and firesleeve end assembly comprising the steps of:

(a) providing a hose attached to a fitting, the hose having an outer diameter, the fitting comprising a hose receiving socket, which circumscribes an end of the hose, and an enlarged portion, the socket having a diameter;

(b) providing a tubular firesleeve; the tubular firesleeve including an inner surface, an end and an outer surface;

(c) coaxially circumscribing the socket and the enlarged portion with a relatively short, flexible, tubular cuff sleeve having an axis and an inner diameter substantially equal to the diameter of the socket and ends defining the cuff sleeve length such that the cuff sleeve is located on the socket;

(d) axially inserting the cuff sleeve located upon the socket into the end of the firesleeve such that the firesleeve end is located between the cuff sleeve ends whereby the portion of the cuff sleeve within the firesleeve constitutes a cuff sleeve inner portion and the portion of the cuff sleeve extending beyond the firesleeve end constitutes a cuff sleeve outer portion; and then (e) folding the cuff sleeve outer portion over the firesleeve end upon the firesleeve outer surface in opposed radial relationship to the cuff sleeve inner portion thereby enclosing and protecting the end of the firesleeve.

2. The method as in claim 1 wherein the cuff sleeve is formed of a resilient material and the cuff sleeve outer portion resiliently embraces the firesleeve outer surface.

3. The method as in claim 1, including the step of circumscribing the cuff sleeve outer portion folded upon the firesleeve outer surface with a clamp to radially clamp the cuff sleeve outer portion upon the hose, the firesleeve to the cuff sleeve inner portion and the cuff sleeve inner portion to the socket.

\* \* \* \* \*